(12) United States Patent
Farrell et al.

(10) Patent No.: US 6,738,511 B1
(45) Date of Patent: May 18, 2004

(54) REDUCED NOISE SENSITIVITY METHOD AND APPARATUS FOR CONVERTING AN INTERFEROGRAM PHASE MAP TO A SURFACE PROFILE MAP

(75) Inventors: Colin T. Farrell, Sahuarita, AZ (US); Jon D. Herron, Jr., Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 664 days.

(21) Appl. No.: 09/679,277

(22) Filed: Oct. 4, 2000

(51) Int. Cl.[7] .............................................. G06K 9/00
(52) U.S. Cl. ...................................... 382/168; 382/172
(58) Field of Search ................................ 356/456, 477, 356/487, 489, 495, 497, 512, 513, 514, 515, 521; 382/106, 108, 154, 162, 168, 172, 270, 275, 276

(56) References Cited

U.S. PATENT DOCUMENTS

| | | | | |
|---|---|---|---|---|
| 4,639,139 A | | 1/1987 | Wyant et al. ............... | 356/497 |
| 5,133,599 A | * | 7/1992 | Sommargren ............... | 356/487 |
| 5,321,497 A | | 6/1994 | Ai et al. ...................... | 356/514 |
| 5,710,631 A | * | 1/1998 | Bou-Ghannam et al. .... | 356/495 |
| 5,717,782 A | | 2/1998 | Denneau, Jr. ............... | 382/154 |
| 5,991,028 A | * | 11/1999 | Cabib et al. ................. | 356/456 |
| 6,028,670 A | * | 2/2000 | Deck ........................... | 356/497 |
| 6,181,430 B1 | * | 1/2001 | Meyer et al. ................ | 356/495 |
| 6,490,046 B1 | * | 12/2002 | Drabarek et al. ........... | 356/489 |
| 6,552,807 B1 | * | 4/2003 | Mitsutani et al. ........... | 356/512 |
| 6,552,808 B2 | * | 4/2003 | Millerd et al. .............. | 356/521 |
| 6,577,400 B1 | * | 6/2003 | Klaver ........................ | 356/477 |

OTHER PUBLICATIONS

"Phase Unwrapping," Chapter 11 of Daniel Malacara et al, Interferogram Analysis for Optical Testing (Marcel Dekker) pp. 381–407.

Jungang Zhong and Ming Wang, "Phase Unwrapping by a Lookup Table Method: Application to Phase Maps with Singular Points," in Optical Engineering v 38#12 (Dec. 1999) 2075–2080.

J. M. Huntley, "New Methods for Unwrapping Noisy Phase Maps," in SPIE vol. 2340 p. 110+.

* cited by examiner

Primary Examiner—Andrew W. Johns
Assistant Examiner—Amir Alavi
(74) Attorney, Agent, or Firm—William A. Birdwell; Durando Birdwell & Janke, PLC

(57) ABSTRACT

In the process of converting an interferogram phase map to a surface profile, in the absence of tilt, a histogram of occurrences of phase values is created from phase data. Useful data are identified in bins with contents that exceed a threshold value. Where useful data wrap around the end of the histogram, a selected amount of phase shift is added to the phase data to move them all within the ends of the histogram. Where tilt is present, the phase data are differentiated to produce slope data and a histogram of occurrences of slope values is created. A best-fit amount of tilt is determined from the slope histogram by selecting the bin at the average between two points on the histogram curve that are a predetermined percentage of the maximum height of the curve. Thereafter, the best-fit tilt is subtracted from the original phase data to eliminate tilt.

16 Claims, 5 Drawing Sheets

REDUCED NOISE SENSITIVITY METHOD AND APPARATUS FOR CONVERTING AN INTERFEROGRAM PHASE MAP TO A SURFACE PROFILE MAP

BACKGROUND OF THE INVENTION

This invention relates to optical metrology, and particularly to the use of interferometry to measure the surface profile of an object with reduced noise sensitivity.

In the use of interferometry to measure the surface profile of an object, the object is illuminated with a reference light beam and the light reflected from the object is caused to interfere with the reference beam so as to produce a two-dimensional interference pattern, or "interferogram." The interferogram is a function of the two-dimensional distribution of the phase difference between the reference and reflected beams, or "phase map." Since the phase map depends on the optical path difference ("OPD") between those beams, it represents a two-dimensional map of the surface profile of the object.

The interferogram is a two-dimensional distribution of light intensity which varies as follows:

$$I(x, y) = w_r(x, y) + w_t(x, y)|^2 = a^2 + b^2 + 2(ab)^{\frac{1}{2}}\cos 2k[s(x, y) - l]$$
$$= 1 + \gamma\cos[\phi(x, y)]$$

where $w_r(x,y)=ae^{2ikl}$, the reference wavefront,
$w_t(x,y)=be^{2iks(x,y)}$, the wavefront reflected from the object under test, $k=2\pi/\lambda$ $\lambda$ is the wavelength of the light,
l is an arbitrary measure of the reference beam path length,
s(x,y) is the surface profile of the object under test,
$\gamma=2ab/(a^2+b^2)$, the interference fringe visibility, and
$\phi(x,y)$ is the phase difference between the reference beam and the beam reflected from the object under test due to variations in the surface profile of the object.

Since the reference wavefront is considered to be flat and l is fixed, variations in the surface profile of the object under test, s(x,y), are proportional to the phase difference between the test and reference beams, $\phi(x,y)$, and an arccosine function of variations in the intensity of the interference fringes, I(x,y).

Often the average surface height of the object under test is not parallel to the reference beam wavefront. This introduces a linear component in phase difference, $\phi(x,y)$, which is known as tilt. It is often desirable to remove the tilt from phase difference measurements as a step in calculating the surface profile from the phase difference measurements.

Typically, the interferogram is imaged onto a video camera or CCD array, which is used to produce a two-dimensional array of measurement points, or pixels. A corresponding two-dimensional array of phase map pixels, $\phi(x_i,y_j)$, is then produced using one of a variety of known methods. The surface profile is calculated from this array of pixels. A system for performing this process is described, for example, in Wyant et al., U.S. Pat. No. 4,639,139, entitled OPTICAL PROFILER USING IMPROVED PHASE SHIFTING INTERFEROMETRY ("Wyant et al."), hereby incorporated by reference in its entirety.

A problem in determining the surface profile from the phase map, $\phi(x_i,y_j)$, is that the cosine function repeats, or wraps around, every $2\pi$ radians of phase difference, that is, every wavelength, $\lambda$, units of OPD. So, for example, one cannot tell the difference between cos $\pi/4$ and cosine $5\pi/4$. Since one wavelength of the light used to produce the interferogram is often less than the cumulative variations in object surface height from one pixel to the next, sometimes even less than the change in surface height between one pixel and the next pixel, and often less than the difference in OPD introduced by tilt, it is necessary to account for the discontinuities caused by the aforedescribed wrapping. Doing so is called "unwrapping."

Another problem in determining the surface profile from $\phi(x_i,y_j)$ is that both the discontinuities caused by wrapping and the sampling to produce pixels, as well as other random variations in the phase difference data, produce noise in the phase map, $\phi(x_i,y_j)$, which can produce measurement errors. It is desirable to reduce the sensitivity to that noise.

There are several methods used to calculate a surface profile map from a phase difference map. They differ mainly in the way that they handle noise.

One such method, sometimes referred to as "standard integration", scans through the phase data consecutively and removes each half-wave discontinuity as it is encountered by adding or subtracting $2\pi$ radians of phase to the adjusted previous adjacent pixel to adjust the phase of the current pixel, if needed. This step is adequate as long as there is no noise and the phase difference between adjacent pixels is less than $2\pi$ radians. However, there usually is noise, and discontinuities greater than $2\pi$ radians may be introduced by discontinuities in surface height, and regional under sampling of the fringe pattern, that is, where the sample frequency is such that the absolute value of the phase difference between two pixels is $2\pi$ radians or more. In the case of discontinuities additional steps must be taken, such as those described in D. Malacara, et al., *Interferogram Analysis for Optical Testing*, pp. 381–407 (1998). After the phase is unwrapped, tilt is then removed.

A problem with standard integration is that noise tends to propagate from one pixel to the next. This is because each phase adjustment is made with respect to the next preceding pixel. Thus, if there is a noise error in a pixel, that error will affect all of the subsequently evaluated pixels.

In standard integration, noise is reduced by relying on the fact that high noise data typically has a low modulation value. By raising the modulation threshold, most of the noise can be eliminated. The modulation value is the term $2(ab)^{1/2}$ in the interferogram intensity pattern equation shown above.

Another method for unwrapping, commonly known as "enhanced integration", uses the standard integration steps but adds some data processing to reduce noise that gets through despite raising the modulation threshold. Errors in this method normally result in a streak of pixels running in the x or y direction at the wrong height.

In yet another method for unwrapping, commonly known as "roughness filtering," the phase data is first separated into "rough," "smooth," and "cliff" categories, then treated according to its category. This categorization is accomplished by comparing height differences between adjacent pixels to empirically obtained standards. Cliff data is that which represents at least a halfwave discontinuity. Smooth data is noise free. Rough data does not fit into either of the other two categories and is ignored.

In the measurement of the surface contour of relatively flat surfaces, such as the surfaces of a magnetic disk recording head, noise is the prevalent problem. Surface height variations do not tend to exceed one-half wavelength, though tilt is typically present, but noise often causes a discontinuity to be introduced during the unwrapping. It has been found that because the aforementioned unwrapping methods adjust the phase based on the next-preceding pixel, they are sensitive to noise and produce errors in measuring the surface contour of such relatively flat objects. Therefore, there is a need for reduced noise sensitivity method and apparatus for converting an interferogram phase map to a surface profile map.

SUMMARY OF THE INVENTION

The present invention addresses the aforementioned phase unwrapping problem and meets the aforementioned need for reduced noise sensitivity in the measurement of the contour of objects, particularly relatively-flat objects.

Assuming either that the phase data has no significant tilt or that the phase data has been adjusted to remove phase discontinuities due to tilt, a histogram is created from the phase data wherein the bins of the histogram represent phase values from zero to $2\pi$ radians relative to a reference beam and the items in the bins represent occurrences of respective phase values in the phase data. Useful phase data is then identified by selecting groups of bins whose contents exceed a threshold value. Where useful data wraps around the end of the histogram to the beginning thereof, a selected amount of phase shift is added to the phase data so as to move all of the useful data within the ends of the histogram and thereby avoid errors from discontinuities. Ordinarily the amount of phase shift added is that fraction of $2\pi$ radians which corresponds to the bin of the histogram having the least number of occurrences therein.

Where tilt is present, additional processing is first used to remove the tilt. The phase data is first differentiated to produce slope data. A slope histogram of the differentiated phase data is then created wherein the bins of the histogram represent slope values and the items in the bins are occurrences of corresponding slope values in the differentiated phase data. A best-fit amount of tilt is determined from the slope histogram by calculating the average slope between two points on the histogram curve that are a predetermined percentage of the maximum height of the curve. Thereafter, the best-fit tilt is subtracted from the original phase data to eliminate tilt.

Therefore, it is a principal objective of the present invention to provide a novel and improved method and apparatus for unwrapping phase data in measuring the profile of a surface using interferometry.

It is another objective of the present invention to provide a method and apparatus for unwrapping phase data in the measurement of the profile of a relatively flat surface using interferometry.

It is a further objective of the present invention to provide a method and apparatus for unwrapping phase data in measuring the profile of a surface using interferometry wherein sensitivity to noise in the phase data is reduced.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
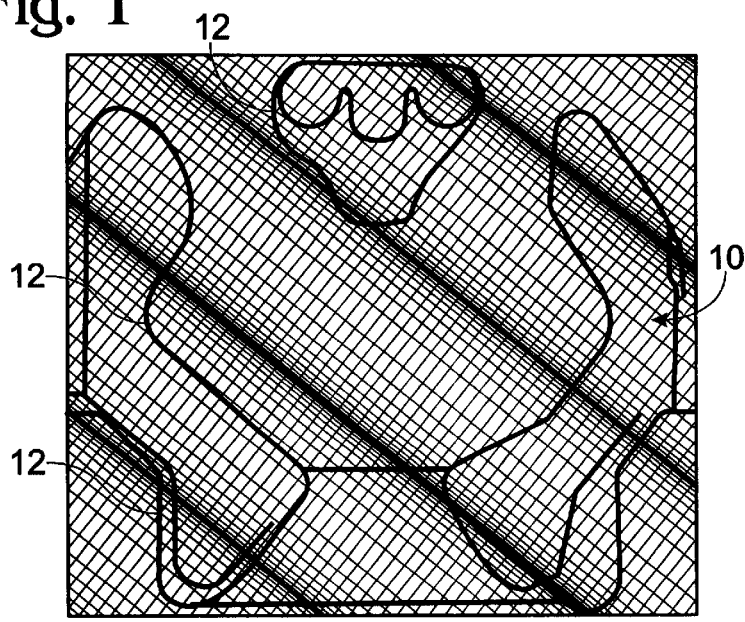
FIG. 1 is a top view of a typical phase map produced from an interferogram of a magnetic recording disc head.

An interferogram of a surface may be obtained by any of a number of well-known techniques and instruments, such as that described in Wyant et al. A typical such phase map 10 is shown in FIG. 1 hereof.

The present invention is particularly adapted for use in measuring the profile of relatively flat surfaces, but is not limited thereto. In FIG. 1, the phase map represents a magnetic recording head for a magnetic memory disc drive, which is typically such a relatively flat surface. The outline of surface discontinuities of the recording head can be seen, for example, at 12.

Figure 2:
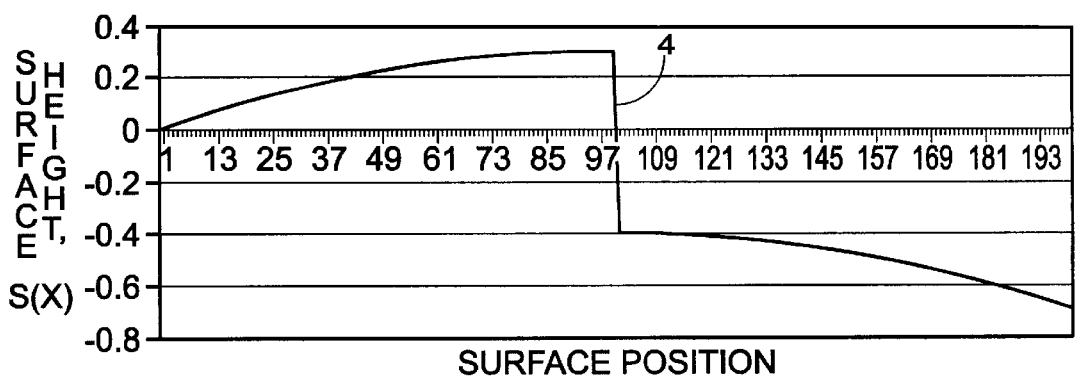
FIG. 2 is a graph in one-dimension of the surface profile of a relatively-flat hypothetical object under test as a function of surface position in that dimension.

A one-dimensional profile 2 of a hypothetical surface of an object under test is shown in FIG. 2. Surface height is indicated by the vertical axis, while surface position along that one dimension is indicated by the horizontal axis. In mathematical terms, the profile can be considered the function s(x). The hypothetical surface includes a discontinuity 4.

Figure 3:
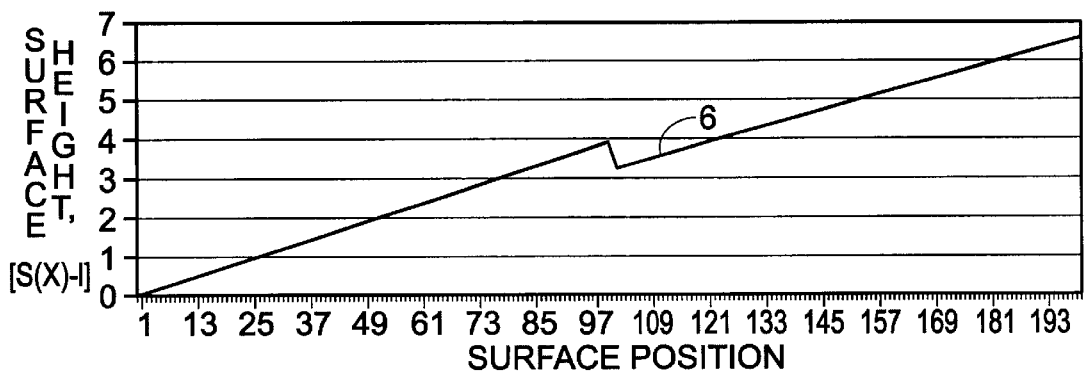
FIG. 3 is a graph in one-dimension of the surface profile of the hypothetical object under test and a tilt component, as a function of surface position in that dimension.

A one-dimensional profile 6 of the hypothetical surface of FIG. 2 combined with a tilt component is shown in FIG. 3. In mathematical terms, the profile can be considered the function [s(x)–l(x)], as explained above in the Background of the Invention, where l is linear function of x including a tilt component. Often the surface profile includes tilt, which may be intentionally introduced for analytical purposes.

Figure 4:
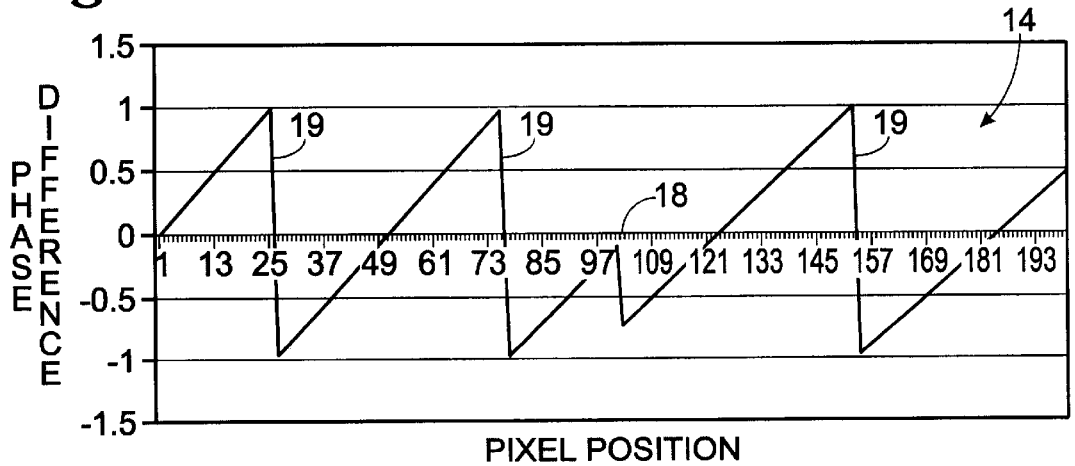
FIG. 4 is a graph in one-dimension of the phase difference between a light beam reflected from the surface of object under test in FIG. 3, and a reference light beam, as a function of pixel position in that dimension, that is, the wrapped test surface phase data.

A graph 14 of phase data in one dimension of a phase map of the aforementioned hypothetical surface profile of an object under test, including tilt, is shown in FIG. 4. It can be seen that, in addition to the phase discontinuity 18 resulting from the discontinuity 4 in the surface profile, there are numerous discontinuities 19 resulting from phase wrapping. In the remaining description it is assumed that the phase data includes tilt, though the presence of tilt is not necessary for the invention.

Figure 5:
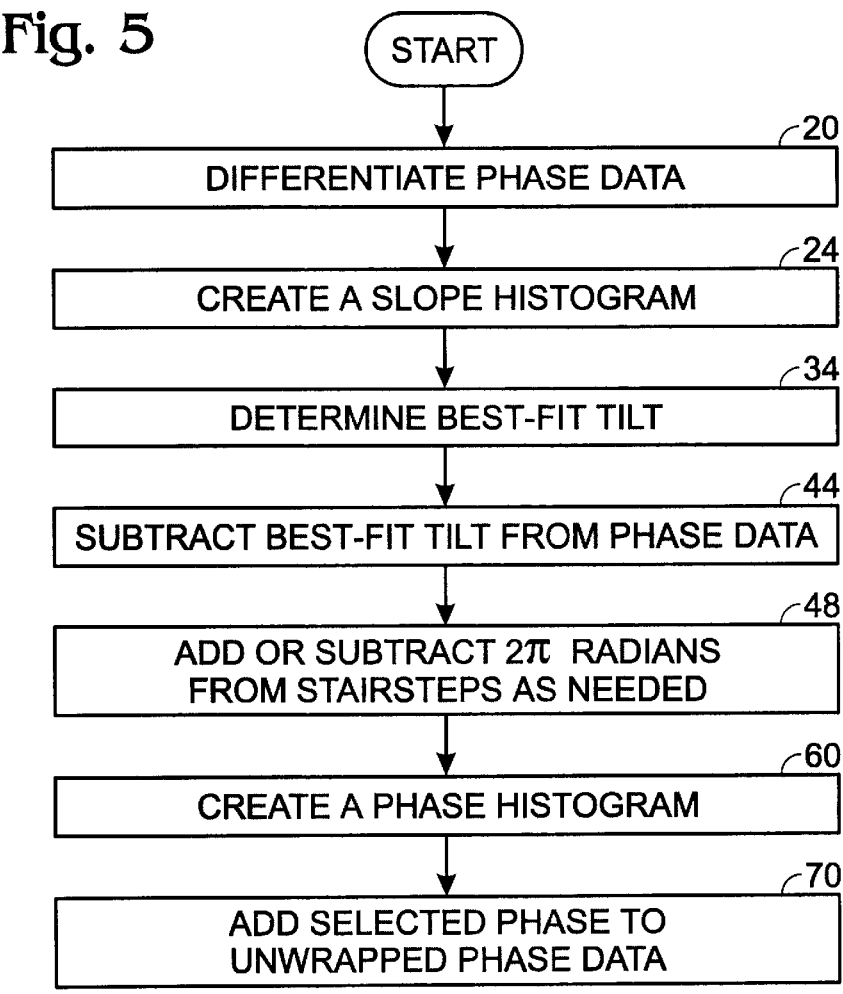
FIG. 5 is a flow chart of the method of a preferred embodiment of the present invention.
Figure 6:
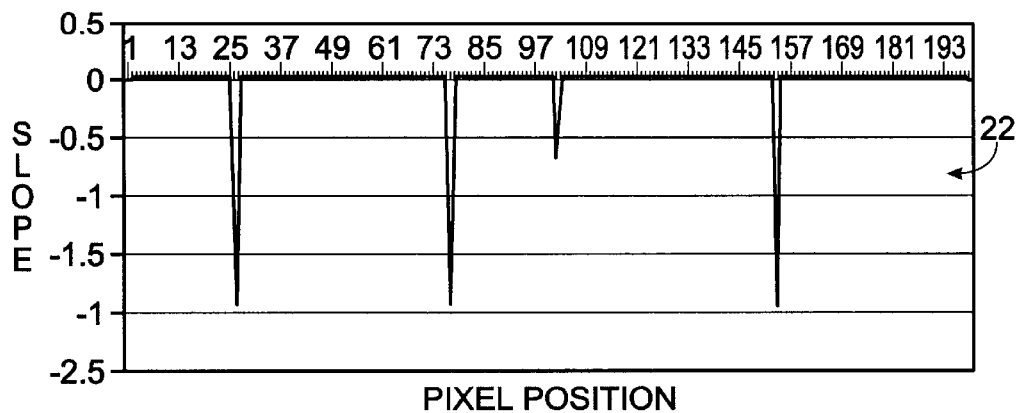
FIG. 6 is a graph of the differentiated data of the graph of FIG. 4.

Turning to FIG. 5, which shows a flow chart of the method of the present invention, the first step 20 in unwrapping the phase data obtained from an interferogram is to differentiate the phase data to obtain slope data 22 representative of the slope of the test surface, as shown in FIG. 6.

Figure 7:
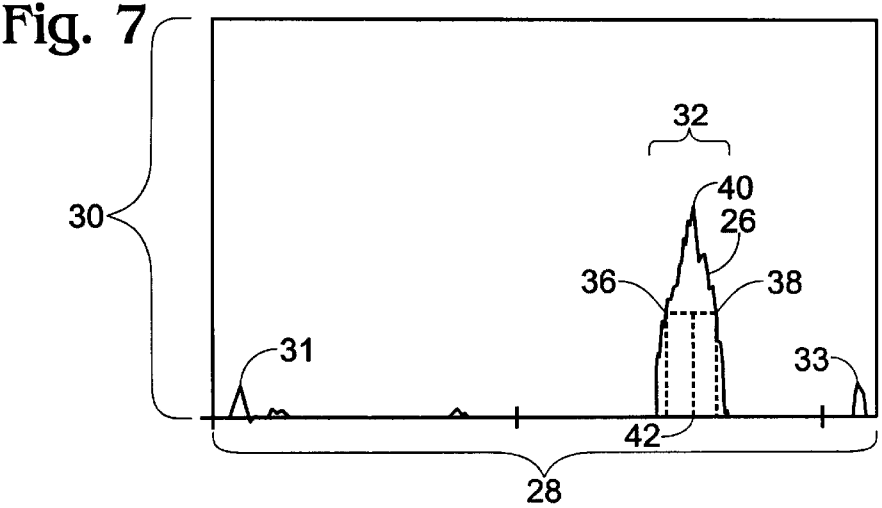
FIG. 7 is a histogram of the differentiated data of the graph of FIG. 6 using bins of fixed width, showing the manner in which the average slope of the histogram is determined.

The second step 24 in unwrapping the phase data is to create a slope histogram 26 of the slope data 22. In the preferred embodiment of the invention, the histogram is formed by using bins of fixed width, as shown in FIG. 7. The bins 28 of the histogram represent a range of slopes of the surface of object under test. The items 30 in the bins represent occurrences of respective slopes in the slope data. It can be seen that the most significant slope data can be readily identified at bin group 32 as that which exceeds some threshold number of slope occurrences. Bin groups 31 and 33 represent noise extremes which, were it not for the use of bins of fixed width, would reduce the resolution of the histogram.

In the next step 34 the best-fit slope of the test surface with respect to the wavefront of the reference beam, or tilt, is determined. This is done by first finding the points 36 and 38 on the leading and trailing edges, respectively, of the most-significant data in bin group 32 that correspond to a selected percentage of the maximum value of that data 40, then identifying the average slope 42 between those points. That average is taken to be the best-fit slope or tilt of the test surface. The aforementioned percentage of the maximum value is determined empirically so as to achieve the most accurate results, but would typically be the range of about forty to seventy percent.

Figure 8A:
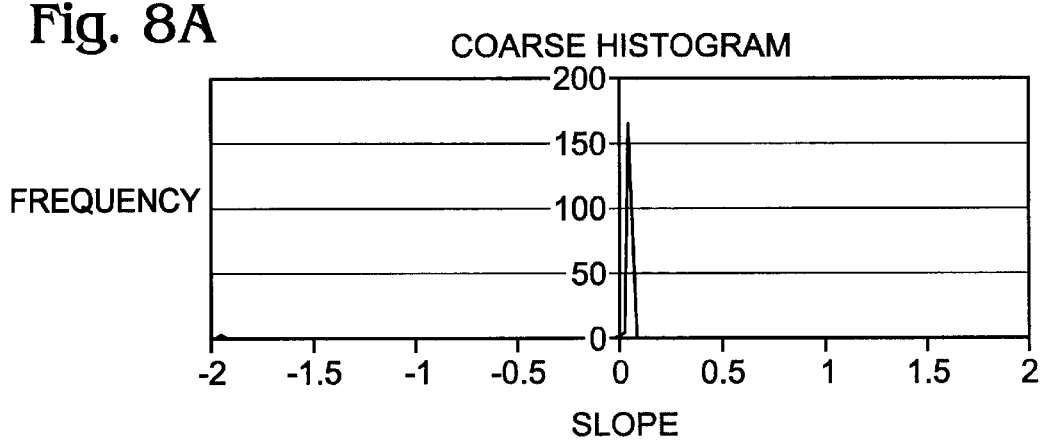
FIG. 8A is a course histogram of the differentiated data of the graph of FIG. 6 using a fixed number of bins.
Figure 8B:
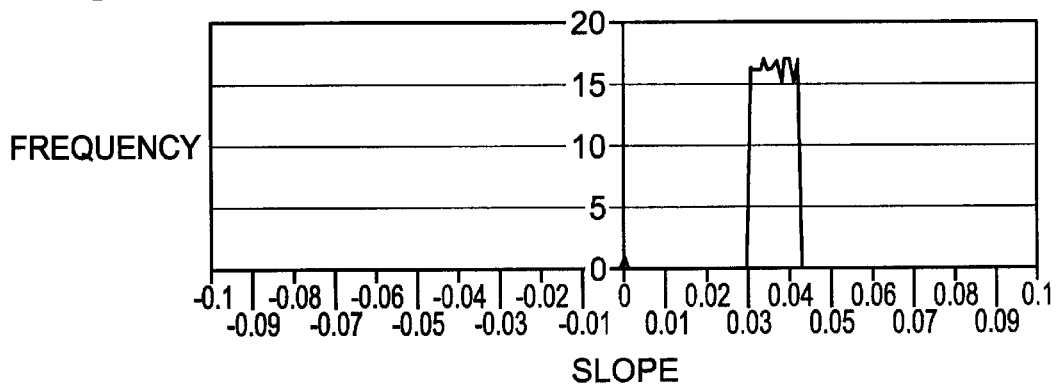
FIG. 8B is a limited range histogram of the differentiated data of the graph of FIG. 6 using a fixed number of bins.

In an alternative embodiment, the histogram is formed with a fixed number of bins. As shown in FIG. 8A, a fixed number of bins provides course resolution. As shown in FIG. 8B, a reduced range of slope provides fine resolution. The same technique is then applied to determine the average slope.

Figure 9:
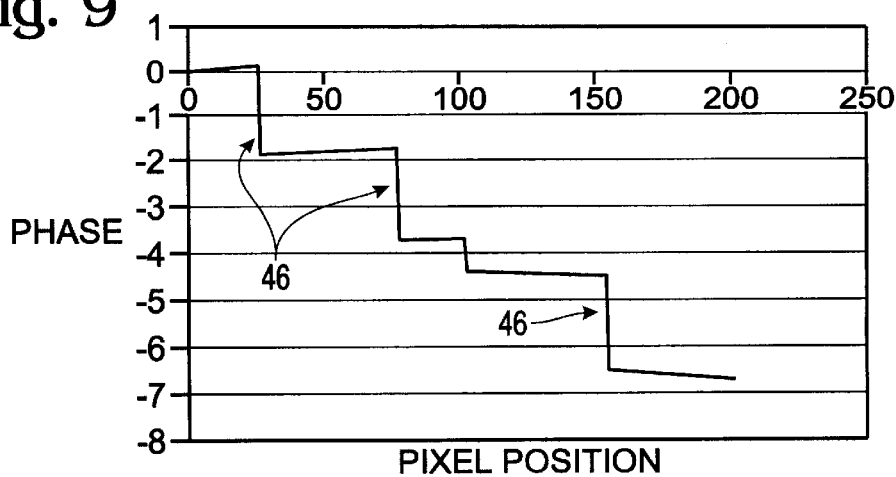
FIG. 9 is a graph of the data in FIG. 4 modified by subtracting therefrom the average slope of the histogram shown in FIG. 7.

Once the tilt is found, it is then subtracted from the original phase data in step 44 to eliminate the tilt component therein. This produces a set of stairstep surface data, as shown in FIG. 9. The discontinuities at each step, such as discontinuity 46, represent phase discontinuities produced by tilt and cumulative phase-difference values. The discontinuity 47 represents the surface profile discontinuity 4.

Figure 10:
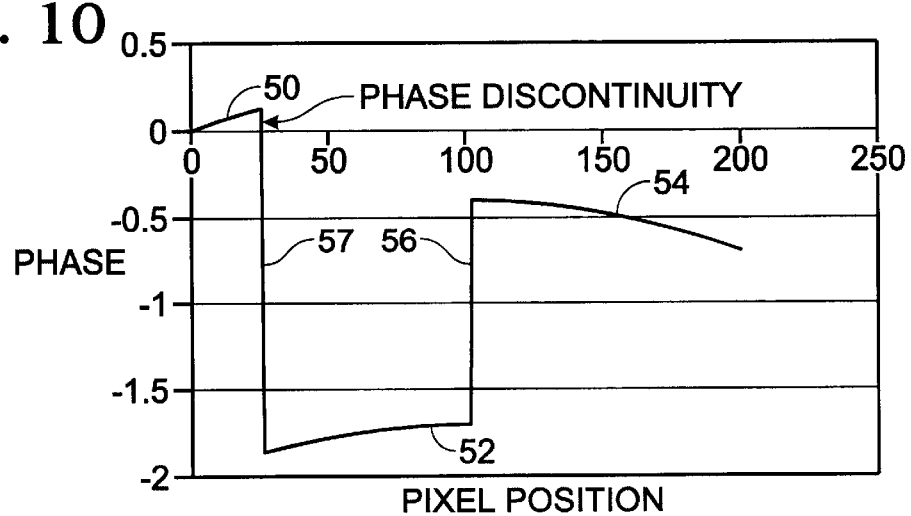
FIG. 10 is a graph of the unwrapped phase data.

The next step 48 is to unwrap the phase data by adding to or subtracting from one or more of the stairsteps in the phase data an integral number of $2\pi$ radians of phase, or one-half wavelengths of the test light. The number of such $2\pi$ radians of phase added to a stairstep is that which is needed to move the stairstep into the phase range of 0 to $2\pi$ radians. This produces unwrapped phase data, as shown in the graph of FIG. 10. In this graph, portions 50 and 52 represent one relatively-flat level of the test surface, while portion 54 represents another relatively-flat level, with phase discontinuity 57 between portions 50 and 52, and a combined surface and phase discontinuity 56 between portions 52 and 54.

Whether the phase data is unwrapped using the afore-described procedure or some other procedure, there may be a phase discontinuity in the relevant phase data that can produce an error in evaluating the surface profile. This arises because the value of the reference surface level is indeterminate. It is important to remove any such phase discontinuity.

Figure 11:
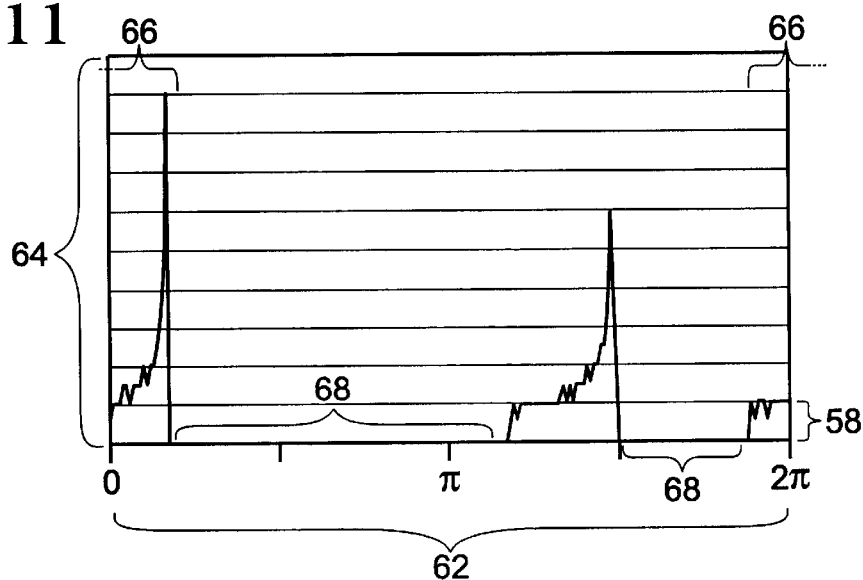
FIG. 11 is a histogram of the data in FIG. 10.

In step 60, a phase histogram is created, as shown in FIG. 11. The bins 62 of the histogram represent the phase difference between the reference light beam wavefront and a light beam reflected from the test surface, with tilt removes. The items 64 in the bins represent occurrences of respective said phase values in the unwrapped phase data. Where, as in FIG. 11, some of the most significant data 66 wraps from the end of the phase histogram, that is, $2\pi$ radians, to the beginning thereof, that is, 0 radians, there is a phase discontinuity 58 in that data that needs to be removed.

Figure 12:
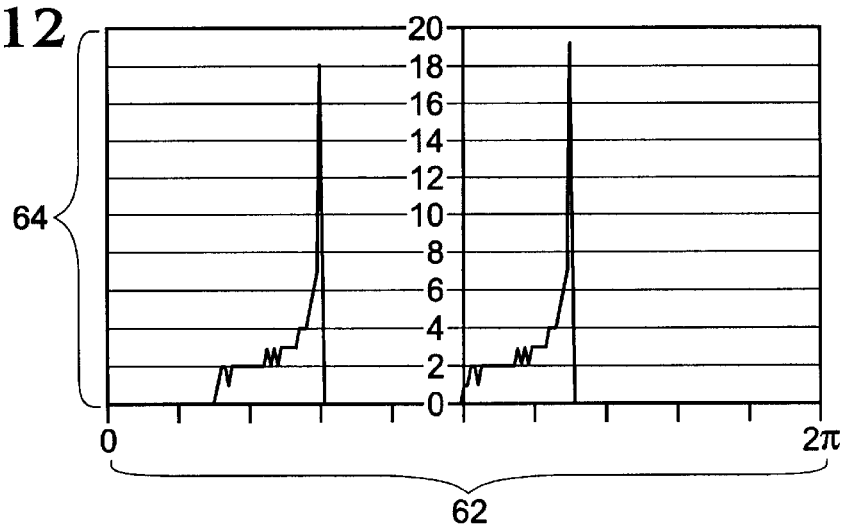
FIG. 12 is a histogram of the data in FIG. 10 modified by adding thereto a selected amount of phase difference to reposition the data between the ends of the histogram.
Figure 13:
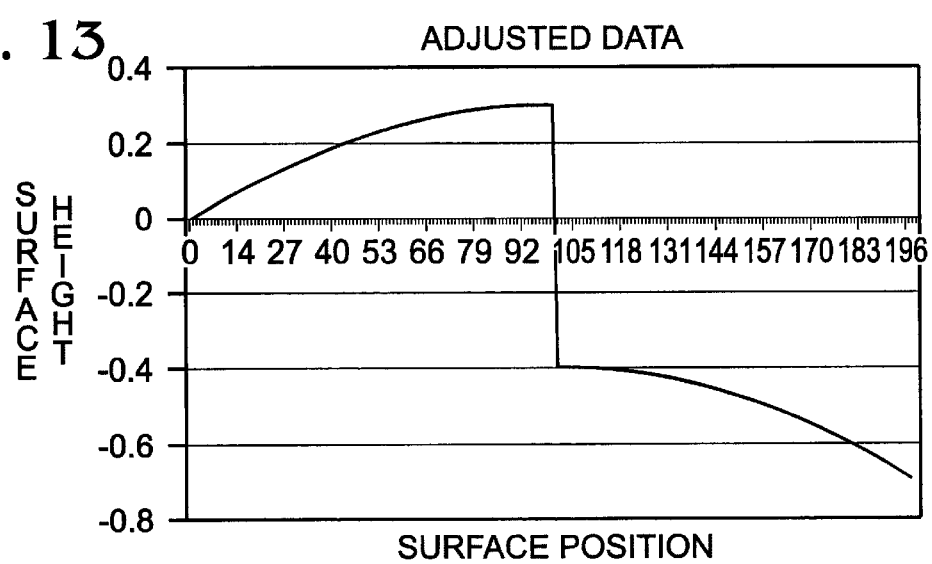
FIG. 13 is a graph of the phase data of FIG. 10 adjusted by the selected amount of phase difference employed to reposition the histogram of FIG. 11.

The phase discontinuity 58 is removed by adding a selected value to the unwrapped phase data, in step 70. While other values might be used without departing from the principles of this invention, the preferred adjustment value is that obtained by taking that fraction of $2\pi$ radians corresponding to the phase of one of the least filled bins 68. Where there is more than one least filled bin, the fraction is preferably chosen so that the most significant data in the histogram is centered in the histogram. (The unwrapped and adjusted phase data is illustrated by the histogram of FIG. 12, but creation of this histogram is not necessary for the invention.) Finally, the scaled surface profile is produced from the unwrapped and adjusted phase data, as shown in FIG. 13.

The foregoing method, and the apparatus referred to hereafter, reduce sensitivity to noise because, by using a histogram, the one-half wavelength phase adjustments of a pixel are referenced to all of the phase-map pixels, rather than merely to the next adjacent pixel.

It is to be recognized that the steps described above and in FIG. 4 are carried out by a computer, ordinarily a programmed digital computer, as is commonly understood in the art. Such a programmed computer comprises an apparatus for converting phase data from an interferogram to a surface profile.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method for converting phase data from an interferogram of a test surface to surface profile data, comprising the steps of:

acquiring interferogram phase data representative of the surface profile of an object;

creating a phase histogram from said phase data, wherein the bins of said phase histogram represent phase values and the items in said bins represent occurrences of respective said phase values in said phase data; and determining whether a portion of said phase histogram that exceeds a selected threshold wraps from the end of said phase histogram to the beginning thereof and, if so, adding a selected value to a portion of said phase data so as to eliminate that wrap.

2. The method of claim 1, further comprising, prior to said step of creating said phase histogram, the step of removing tilt from said phase data.

3. The method of claim 2, wherein said step of removing tilt from said phase data comprises the steps of differentiating said phase data to obtain slope data; creating a slope histogram from said slope data, wherein the bins of said slope histogram represent an amount of slope and the items in said bins of said slope histogram represent occurrences of respective slope values in said slope data; and determining from said slope histogram a best-fit amount of tilt based on predetermined criteria.

4. The method of claim 3, wherein said step of determining from said slope histogram a best-fit amount of tilt based on predetermined criteria comprises finding the points on the leading and trailing edges, respectively, of the most-significant data in said slope histogram that correspond to a selected percentage of the maximum value of that data, and thereafter taking the average slope between those points as said best-fit amount of tilt.

5. The method of claim 4, further comprising, after said step of removing said tilt and before said step of creating said phase histogram, the step of adding to or subtracting from portions of said phase data an integral number of $2\pi$ radians of phase so as to remove phase discontinuities.

6. The method of claim 2, further comprising, after said step of removing said tilt and before said step of creating said phase histogram, the step of adding to or subtracting from portions of said phase data an integral number of $2\pi$ radians of phase so as to remove phase discontinuities.

7. An apparatus for converting phase data from an interferogram to a surface profile, comprising a computer programmed to:

acquire interferogram phase data representative of the surface profile of an object;

create a phase histogram from said phase data, wherein the bins of said phase histogram represent phase and the items in said bins represent occurrences of respective said phase values in said phase data; and determine whether a portion of said phase histogram that exceeds a selected threshold wraps from the end of said phase histogram to the beginning thereof and, if so, adding a phase value to a portion of said phase data so as to eliminate that wrap.

8. The apparatus of claim 7, further programmed to, prior to creating said phase histogram, remove tilt from said phase data.

9. The apparatus of claim 8, wherein said removal of tilt from said phase data comprises differentiating said phase data to obtain slope data; creating a slope histogram from said slope data, wherein the bins of said slope histogram represent an amount of slope and the items in said bins of said slope histogram represent occurrences of respective slope values in said slope data; and determining from said slope histogram a best-fit amount of tilt based on predetermined criteria.

10. The apparatus of claim 9, wherein said determination from said slope histogram a best-fit amount of tilt based on predetermined criteria comprises finding the points on the leading and trailing edges, respectively, of the most-significant data in said slope histogram that correspond to a selected percentage of the maximum value of that data, and thereafter taking the midpoint slope between those points as best-fit amount of tilt.

11. The apparatus of claim 10, further programmed to, after said removal of said tilt and before said creation of said phase histogram, add to or subtract from portions of said phase data an integral number of $2\pi$ radians of phase so as to remove phase discontinuities.

12. The apparatus of claim 8, further programmed to, after said removal of said tilt and before said creation of said phase histogram, add to or subtract from portions of said phase data an integral number of $2\pi$ radians of phase so as to remove phase discontinuities.

13. A method for removing tilt from phase data from an interferogram of a test surface, comprising the steps of:

acquiring interferogram phase data representative of the surface profile of an object;

differentiating said phase data to obtain slope data;

creating a slope histogram from said slope data, wherein the bins of said slope histogram are of equal size and represent an amount of slope and the items in said bins of said slope histogram represent occurrences of respective slope values in said slope data; and determining from said slope histogram a best-fit amount of tilt based on predetermined criteria.

14. The method of claim 13, wherein said step of determining from said slope histogram a best-fit amount of tilt based on predetermined criteria comprises finding the points on the leading and trailing edges, respectively, of the most-significant data in said slope histogram that correspond to a selected percentage of the maximum value of that data, and thereafter taking the average slope between those points as said best-fit amount of tilt.

15. An apparatus for removing tilt from phase data from an interferogram of a test surface, comprising a computer programmed to:

acquire interferogram phase data representative of the surface profile of an object;

differentiate said phase data to obtain slope data;

create a slope histogram from said slope data, wherein the bins of said slope histogram represent an amount of slope and the items in said bins of said slope histogram represent occurrences of respective slope values in said slope data; and determine from said slope histogram a best-fit amount of tilt based on predetermined criteria.

16. The apparatus of claim 15, wherein said determination from said slope histogram of a best-fit amount of tilt based on predetermined criteria comprises finding the points on the leading and trailing edges, respectively, of the most-significant data in said slope histogram that correspond to a selected percentage of the maximum value of that data, and thereafter taking the average slope between those points as best-fit amount of tilt.

* * * * *